US012649121B2

(12) United States Patent　　(10) Patent No.:　US 12,649,121 B2
Liu et al.　　　　　　　　　　(45) Date of Patent:　　Jun. 9, 2026

(54) ASH COLLECTING SYSTEM

(71) Applicant: Beijing Zhong Xing Hui Rong NRG Saving Tech Co, Ltd, Beijing (CN)

(72) Inventors: Fengyue Liu, Beijing (CN); Haitao Shan, Beijing (CN); Yang Shi, Beijing (CN); Lei Wang, Beijing (CN); Gang Wang, Beijing (CN)

(73) Assignee: Beijing Zhong Xing Hui Rong NRG Saving Tech Co, Ltd, Beijing (CN)

( * ) Notice: Subject to any disclaimer, the term of this patent is extended or adjusted under 35 U.S.C. 154(b) by 539 days.

(21) Appl. No.: 18/237,587

(22) Filed: Aug. 24, 2023

(65) Prior Publication Data

US 2024/0299873 A1　　Sep. 12, 2024

(30) Foreign Application Priority Data

Mar. 9, 2023　　(CN) ......................... 202310219052.7

(51) Int. Cl.
　　*B01D 46/04*　　　(2006.01)
　　*B01D 46/48*　　　(2006.01)
　　*B01D 46/69*　　　(2022.01)
(52) U.S. Cl.
　　CPC ............. *B01D 46/04* (2013.01); *B01D 46/48* (2013.01); *B01D 46/69* (2022.01); *B01D 2273/30* (2013.01)

(58) Field of Classification Search
None
See application file for complete search history.

(56) References Cited

FOREIGN PATENT DOCUMENTS

| CN | 101230410 A | * | 7/2008 | |
| CN | 109529506 A | * | 3/2019 | ............. B01D 50/40 |
| CN | 214106301 U | * | 9/2021 | |
| CN | 215032017 U | * | 12/2021 | |
| CN | 114210144 A | * | 3/2022 | ............. B01D 46/48 |
| CN | 219518139 U | * | 8/2023 | |
| CN | 219541258 U | * | 8/2023 | |

* cited by examiner

*Primary Examiner* — Brit E. Anbacht

(74) *Attorney, Agent, or Firm* — Calderon Safran & Wright PC; Corinne Marie Pouliquen

(57) ABSTRACT

An ash collecting system includes an ash discharge device, an ash conveying pipeline and an ash collecting tank. A first clean air chamber and a first foul air chamber are arranged in a shell. A plurality of first filtering structures and vibrating structures are arranged in the first clean air chamber. The first foul air chamber is provided with a sweeping structure for sweeping ash. The ash collecting tank includes a cylindrical shell and an ash bin. The ash removal port is in communication with the second air inlet. A second clean air chamber and a second foul air chamber are arranged in the cylindrical shell. Second filtering structures are arranged in the second foul air chamber. The ash bin is in communication with the second foul air chamber. An ash collecting structure for collecting ash is arranged in the ash bin.

10 Claims, 8 Drawing Sheets

30        31

ASH COLLECTING SYSTEM

CROSS-REFERENCE TO RELATED APPLICATION

This patent application claims the benefit and priority of Chinese Patent Application No. 202310219052.7 filed with the China National Intellectual Property Administration on Mar. 9, 2023, the disclosure of which is incorporated by reference herein in its entirety as part of the present application.

FIELD OF THE INVENTION

The present disclosure relates to the technical field of semiconductor preparation, in particular to an ash collecting system. The present disclosure relates to an ash removal system for processing process ash in industrial production such as monocrystalline silicon, polycrystalline silicon, and heavily doped silicon single crystals.

BACKGROUND OF THE INVENTION

A large amount of SiO dust which can spontaneously ignite when exposed to air is produced in the crystal pulling process of a single-crystalline or polycrystalline furnace. The SiO dust is filtered by a simple harmonic vacuum dust collector and stored in an ash bin. The dust in the ash bin needs to be discharged when reaching a certain amount. At present, the dust is discharged by the dust collector. Generally, the ash bin is vibrated, and the dust is discharged at a star-shaped ash discharge valve of an ash removal port. For small dust collectors, due to small structural size, original methods such as manual digging, shoveling, and sweeping are generally used to achieve the purpose of ash discharge.

In view of the characteristic that SiO dust can spontaneously ignite or even explode when exposed to air, SiO dust must be slowly oxidized into $SiO_2$ dust before manual dust removal, but this process takes time, and a lot of time loss has seriously restricted the productivity growth.

After a working cycle, the dust collector begins to clean the ash bin. It takes 90-120 minutes to slowly oxidize SiO dust before the ash bin is cleaned. When the ash bin is cleaned manually, protective clothing, goggles and masks are needed. Dust is collected into bags with scrapers and brooms, and dust is produced during the operation, so that secondary pollution to a workshop environment is caused. The burden on cleaning is increased during subsequent equipment maintenance of workshops. Each simple harmonic vacuum collector needs 90-120 minutes of slow oxidation, and the steps are cumbersome. In case of improper operation, deflagration or burning of the equipment may be caused. Great hidden dangers are caused for safety production. And the production efficiency is also restricted.

SUMMARY OF THE INVENTION

The present disclosure aims to provide an ash collecting system. Closed-loop conveying is conducted on ash, and the ash collecting system is matched with other equipment for centralized treatment, so that the problems that the efficiency of manually cleaning the ash bin is low and secondary pollution is easily caused are solved.

In order to achieve the purpose, the present disclosure provides the following scheme.

The present disclosure provides an ash collecting system, including an ash discharge device, an ash conveying pipeline and an ash collecting tank. The ash discharge device includes a shell. A first air outlet, a first air inlet and an ash removal port are formed in the ash discharge device. A first clean air chamber and a first foul air chamber are arranged in the shell. A plurality of first filtering structures and vibrating structures are arranged in the first clean air chamber. The vibrating structures are configured for vibrating the first filtering structures. The first foul air chamber is provided with a sweeping structure. The sweeping structure is configured for sweeping ash filtered by the first filtering structures to the ash removal port. The ash collecting tank includes a cylindrical shell and an ash bin. A second air inlet and a second air outlet are formed in the cylindrical shell. The ash removal port is in communication with the second air inlet through the ash conveying pipeline. A second clean air chamber and a second foul air chamber are arranged in the cylindrical shell. Second filtering structures are arranged in the second foul air chamber. The ash bin is in communication with the second foul air chamber. An ash collecting structure is arranged in the ash bin. The ash collecting structure is configured for collecting ash.

In some embodiments, the ash discharge device also includes a first air pocket. The first air pocket is located outside the shell, a safety valve. A first solenoid valve and a first manual ball valve are arranged on the first air pocket. The first air pocket is in communication with the first clean air chamber through a first blowing pipeline. An air outlet end of the first blowing pipeline is located above the first filtering structure. A pulse valve and a first pneumatic ball valve are arranged on the first blowing pipeline. The first air pocket is in communication with the sweeping structure.

In some embodiments, the ash collecting tank also includes a second air pocket, the second air pocket is located outside the cylindrical shell, the second air pocket is in communication with the second clean air chamber through a second blowing pipeline, and an air outlet end of the second blowing pipeline is located above the second filtering structures.

In some embodiments, the shell includes an upper shell and a lower shell, the upper shell is connected with the lower shell, the first air outlet and an upper temperature measuring port are formed in the upper shell, the first air inlet, a lower temperature measuring port and the ash removal port are formed in the lower shell, a first tube bundle board is arranged between the upper shell and the lower shell, a space enclosed by the upper shell and the first tube bundle board is the first clean air chamber, and a space enclosed by the lower shell and the first tube bundle board is the first foul air chamber.

In some embodiments, the ash collecting tank includes an upper cylindrical shell and a lower cylindrical shell, the upper cylindrical shell is connected with the lower cylindrical shell, a second tube bundle board is arranged between the upper cylindrical shell and the lower cylindrical shell, a space enclosed by the upper cylindrical shell and the second tube bundle board is the second clean air chamber, and a space enclosed by the lower cylindrical shell and the second tube bundle board is the second foul air chamber; and the second filtering structures are sintered plates, and upper ends of the sintered plates are in communication with respective through holes in the second tube bundle board.

In some embodiments, the sweeping structure includes a plurality of nozzles, the nozzles are arranged opposite to the ash removal port, the first air pocket is in communication with the nozzles through respective sweeping pipeline, and each sweeping pipeline is provided with a second solenoid valve and a second pneumatic ball valve.

In some embodiments, the first filtering structures are filter bags, and lower ends of the filter bags are in communication with respective through holes in the first tube bundle board; the vibrating structures are located above the first filtering structures, each vibrating structure comprises a cylinder, a spring and a movable hanger, a cylinder body of the cylinder is connected with the upper shell, a piston rod of the cylinder is configured for pushing the movable hanger, one end of the spring is connected with a fixed hanger in the upper shell, the other end of the spring is connected with the movable hanger, and the movable hanger is connected with upper ends of the first filtering structures.

In some embodiments, the ash discharge device also includes a support and a guide structure, the support and the guide structure are arranged in the first clean air chamber, a lower end of the support is connected with the first tube bundle board, an upper end of the support is provided with the fixed hanger, the guide structure comprises a guide sleeve and a guide rod, the guide sleeve sleeves an outer side of the guide rod, the guide sleeve is connected with the fixed hanger, and the guide rod is connected with the movable hanger.

In some embodiments, the ash collecting structure includes an auger structure, a material collecting board and a scraper, the material collecting board sleeves an outer side of an upper end of an auger main shaft of the auger structure, an outer side of the material collecting board is connected with the ash bin, an inner side of the material collecting board is rotatably connected with the auger main shaft, the scraper is located above the material collecting board, a lower end of the scraper is in contact with the material collecting board, the scraper sleeves the outer side of the upper end of the auger main shaft, the scraper is connected with the auger main shaft, the auger main shaft is rotatably connected with the ash bin, an ash discharge port is formed in a lower end of the ash bin, and a rotary material valve is arranged at the ash discharge port.

In some embodiments, the ash collecting structure is driven by a driving structure, the driving structure comprises a reducing motor, a magnetic outer rotor, a magnetic inner rotor, a universal joint and a reducer, an output end of the reducing motor is connected with the magnetic outer rotor, the magnetic inner rotor is located on an inner side of the magnetic outer rotor, the magnetic inner rotor is connected with an input end of the reducer through the universal joint, and the auger main shaft is connected with an output end of the reducer.

Compared with the prior art, the present disclosure has the following technical effects.

The dusty gas enters the first foul air chamber of the lower shell from the first air inlet, and then enters the filter bags from the lower ends of the filter bags. The gas filtered by the filter bags is discharged from the first air outlet. A part of the ash in the filter bags falls into the first foul air chamber under the action of gravity, and the other part is attached to the inner surfaces of the filter bags. The filter bags are blown by the gas in the first air pocket and vibrated by the vibrating structures, so that the attachments on the inner surfaces of the filter bags fall to the first turbid gas chamber. The ash is blew by inert gas in the first gas bag to the ash removal port, and enters the ash collecting tank through the ash conveying pipeline. The ash is removed by the sintered plate again, and then falls into the second turbid gas chamber and then into the ash bin. The ash is collected through the ash collecting structure, and the purified gas is discharged from the second air outlet. According to the present disclosure, ash does not need to be removed manually. The whole ash removal process is carried out in a closed environment, so that flying ash is prevented from being generated in the operation process, and secondary pollution of a workshop environment is avoided. In addition, inert gas is used for closed-loop conveying. Finally, the ash collecting system is matched with other equipment for centralized treatment, and the ash does not need to be oxidized, so that the time is saved, and the efficiency is improved.

BRIEF DESCRIPTION OF THE DRAWINGS

To more clearly illustrate the present embodiment of the present disclosure or the technical scheme in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

Reference signs: A, ash discharge device; B, ash collecting tank; 1, upper shell; 2, air control box; 3, electric control box; 4, lower shell; 5, ash removal port; 6, second pneumatic ball valve; 7, second solenoid valve; 8, first air pocket; 9, pulse valve; 10, first pneumatic ball valve; 11, first solenoid valve; 12, first manual ball valve; 13, lower temperature measuring port; 14, upper temperature measuring port; 15, connecting pipeline; 16, safety valve; 17, nozzle; 18, first air inlet; 19, first air outlet; 20, fixed hanger; 21, cylinder; 22, cylinder stationary mount; 23, spring; 24, guide mechanism; 25, movable hanger; 26, screw; 27, filter bag; 28, support; 29, first tube bundle board; 30, third pneumatic ball valve; 31, ash conveying pipeline; 32, second air outlet; 33, second tube bundle board; 34, sintered plate; 35, second air inlet; 36, reducing motor; 37, scraper; 38, rotary material valve; 39, auger main shaft; 40, material collecting board; 41, ash bin; 42, lower cylindrical shell; 43, second air pocket; 44, second blowing pipeline; 45, upper cylindrical shell; 46, magnetic inner rotor; 47, flange seat; 48, magnetic outer rotor; 49, distance sleeve; 50, stationary mount; 51, magnetic inner rotor stationary mount; 52, universal joint; 53, reducer; 54, reducer stationary mount; 55, main shaft stationary mount; and 56, ash discharge port.

DETAILED DESCRIPTION OF THE PREFERRED EMBODIMENTS

The following clearly and completely describes the technical scheme in the present embodiments of the present disclosure with reference to the attached figures in the present embodiments of the present disclosure. Apparently, the described embodiments are merely a part rather than all of the present embodiments of the present disclosure. Based on the present embodiment in the present disclosure, all other embodiments obtained by the ordinary technical staff in the art under the premise of without contributing creative labor belong to the scope protected by the present disclosure.

The present disclosure aims to provide an ash collecting system. Closed-loop conveying is carried out on ash, and the ash collecting system is matched with other equipment for centralized treatment, so that the problems that the efficiency of manually cleaning the ash bin is low and secondary pollution is easily caused are solved.

To make the foregoing objective, features and advantages of the present disclosure clearer and more comprehensible, the present disclosure is further described in detail below with reference to the attached figures and specific embodiments.

Figure 1:
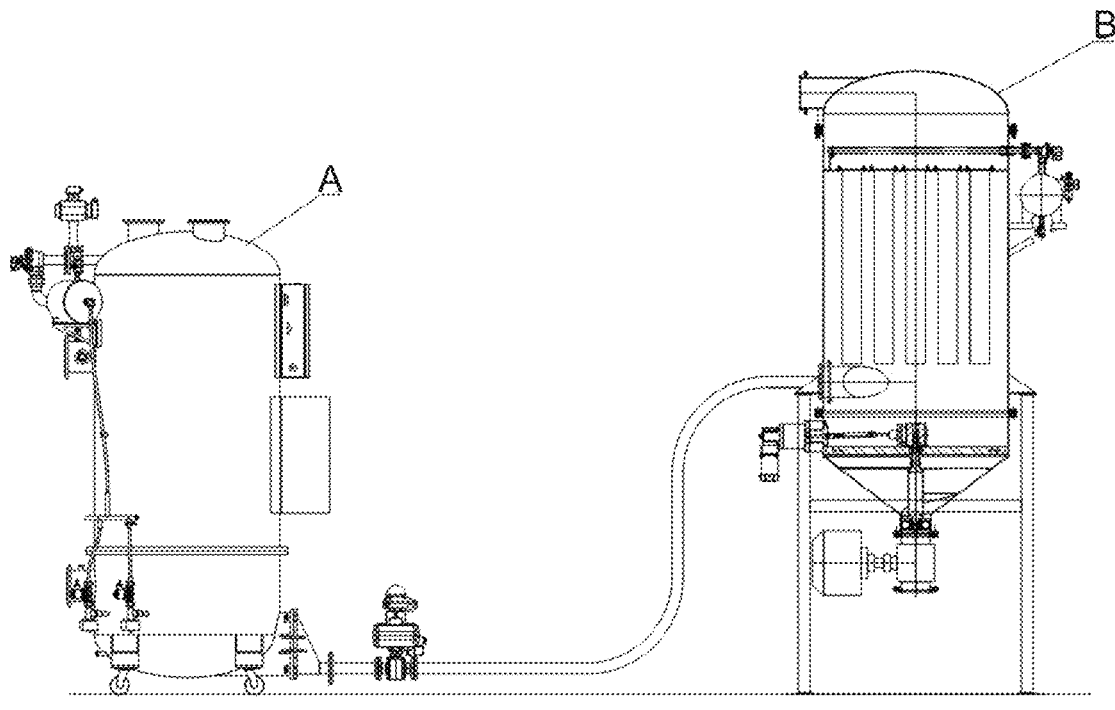
FIG. 1 is a schematic diagram of an ash collecting system in the present disclosure.
Figure 2:
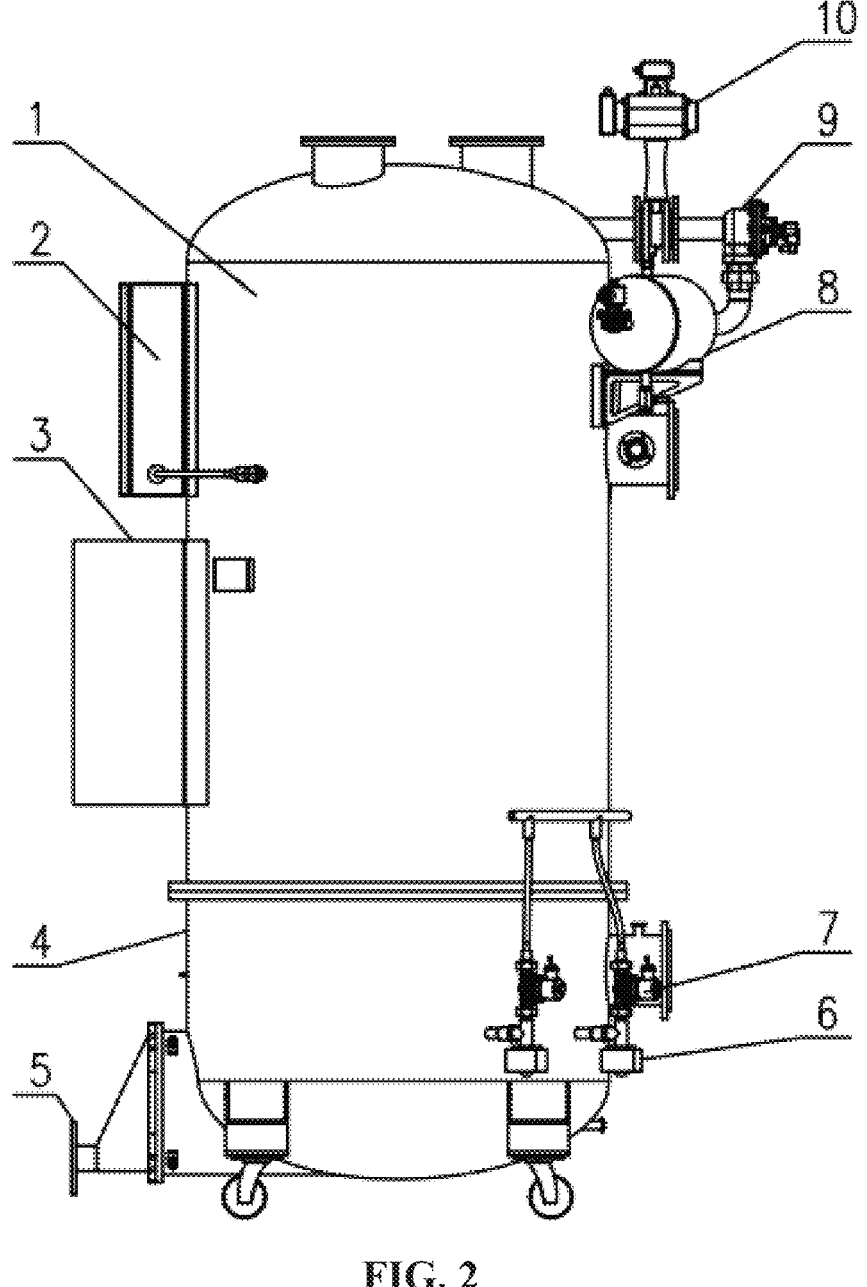
FIG. 2 is a front view of an ash discharge device in the present disclosure.
Figure 3:
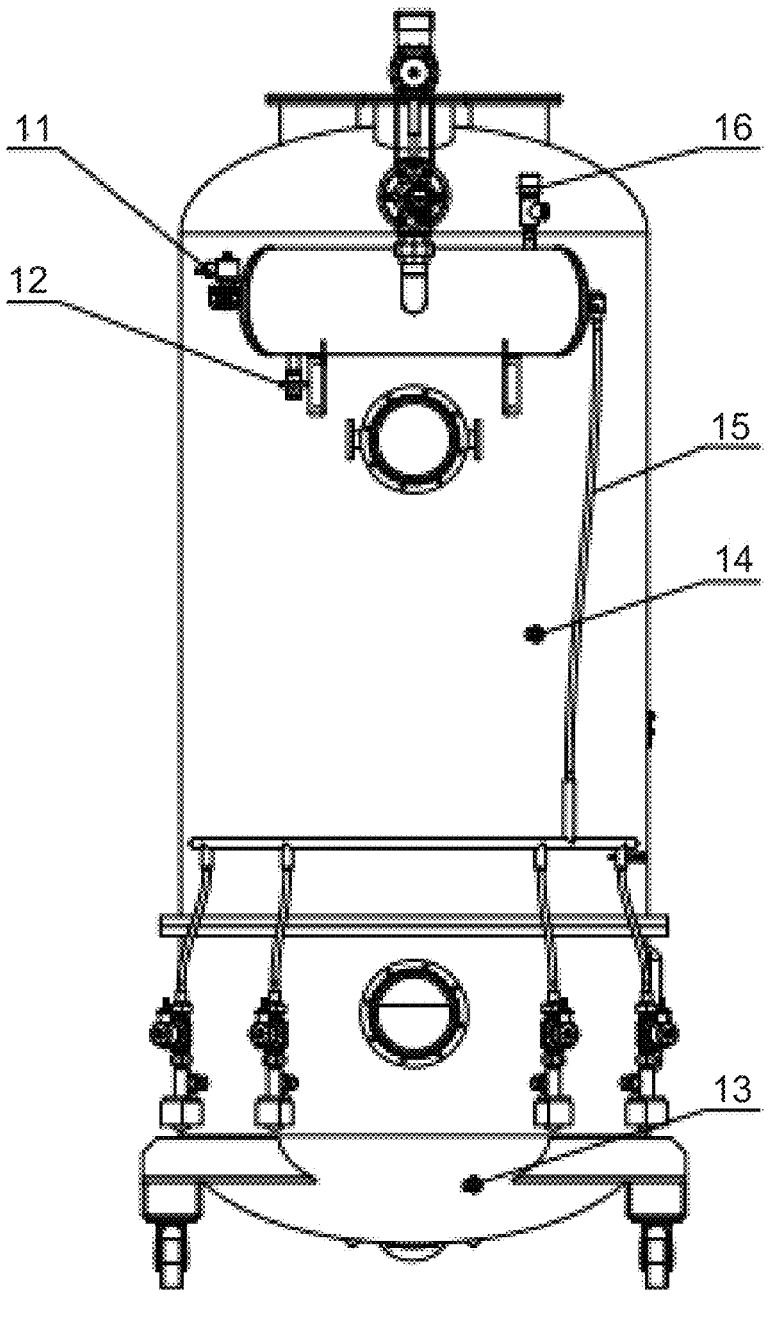
FIG. 3 is a side view of the ash discharge device in the present disclosure.
Figure 4:
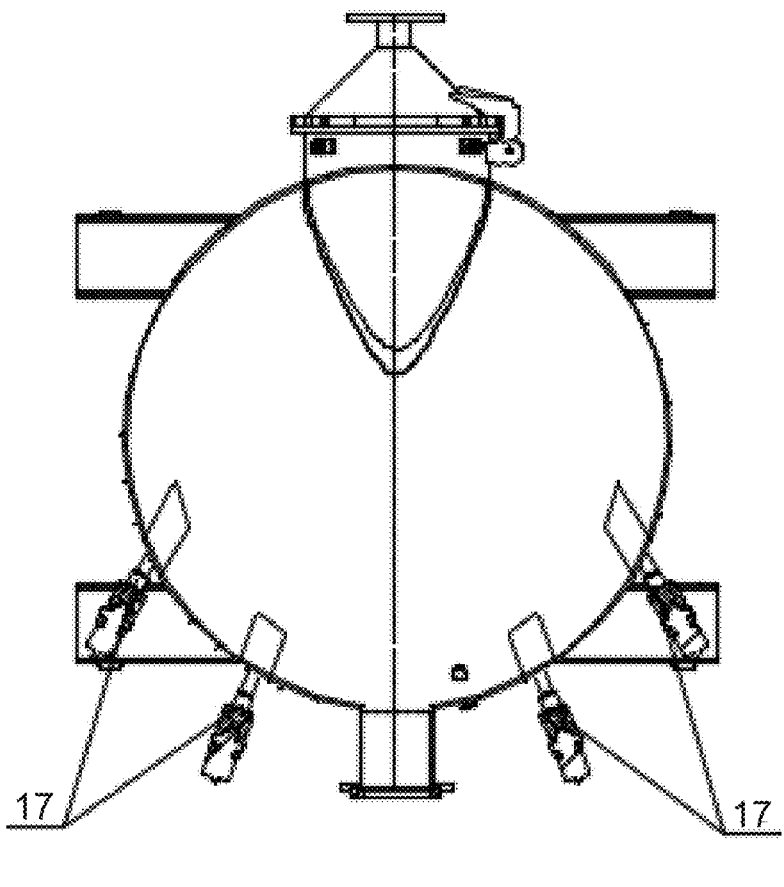
FIG. 4 is a top view of the ash discharge device in the present disclosure.
Figure 5:
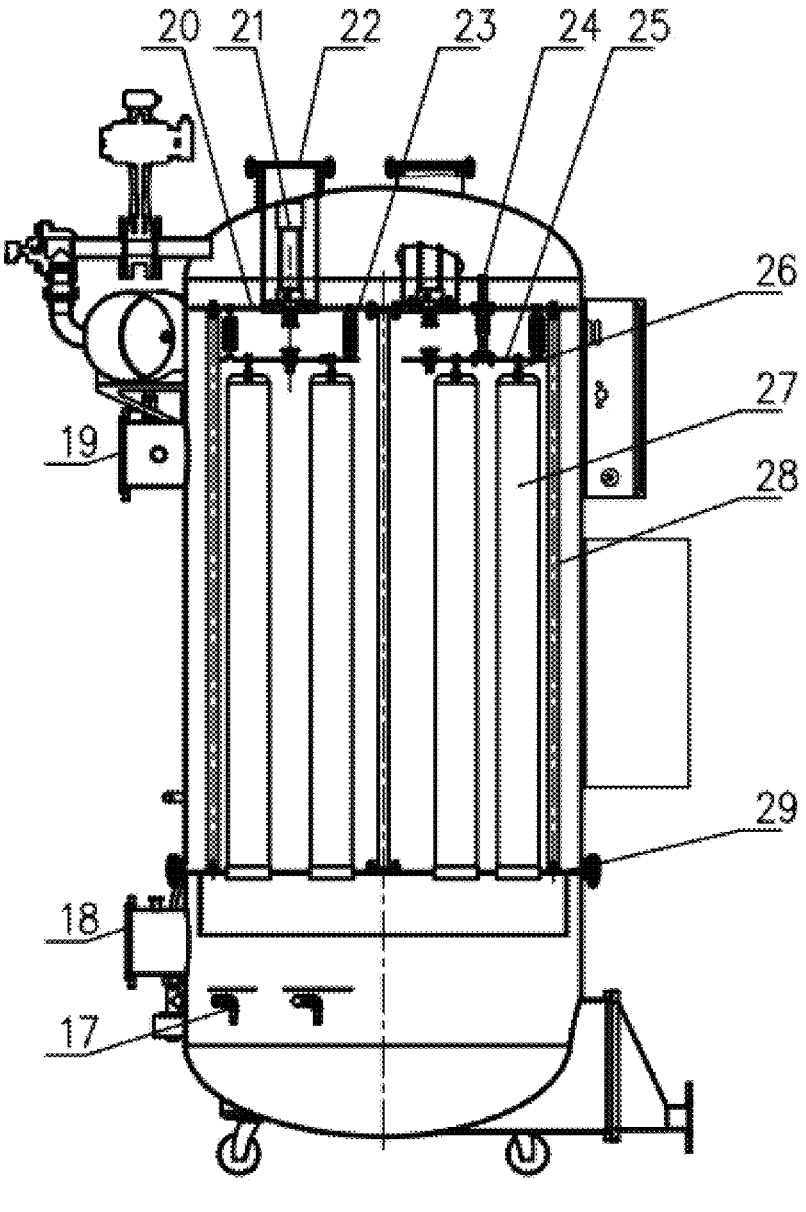
FIG. 5 is an internal schematic diagram of an ash discharge device in the present disclosure.
Figure 6:
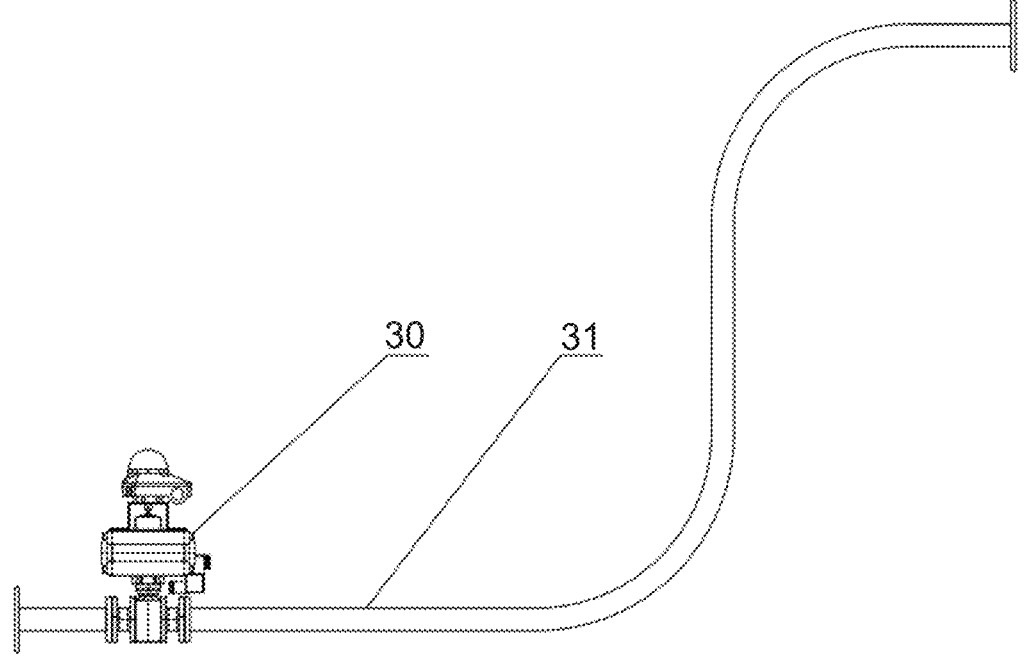
FIG. 6 is a schematic diagram of an ash conveying pipeline in the present disclosure.
Figure 7:
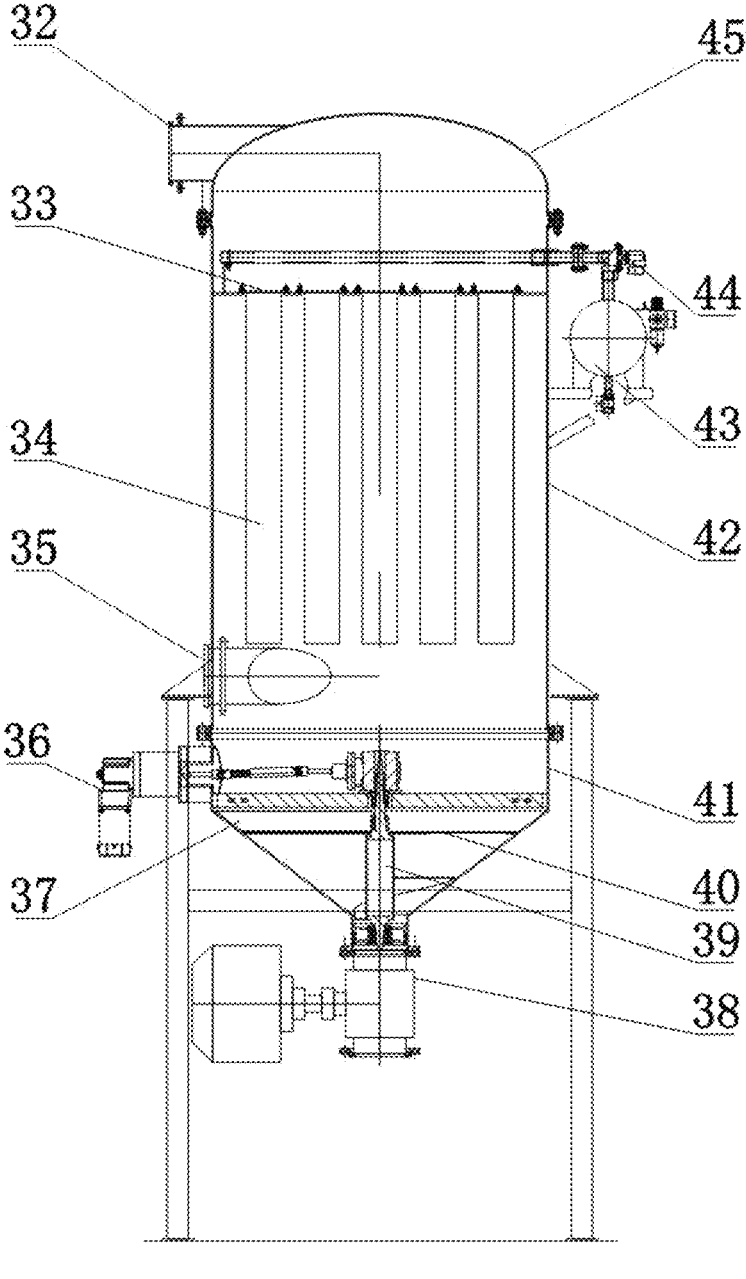
FIG. 7 is an internal schematic diagram of an ash collecting tank in the present disclosure.
Figure 8:
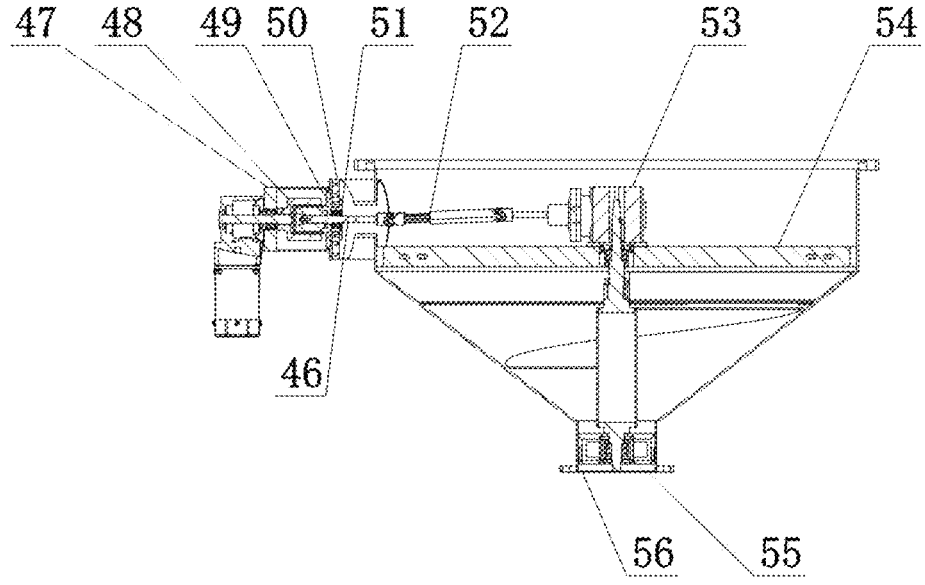
FIG. 8 is a structural schematic diagram of a driving structure and an ash collecting structure in the present disclosure.

As shown in FIG. 1 to FIG. 8, the present embodiment provides an ash collecting system, including an ash discharge device A, an ash conveying pipeline 31 and an ash collecting tank B. The ash discharge device A is used for filtering ash at a production end. The ash discharge device A is an ash separator with a sweeping structure for discharging ash on line through conveyed pneumatic force. The ash collecting tank B is used for filtering ash. The ash discharge device A includes a shell. A first air outlet 19, a first air inlet 18 and an ash removal port 5 are formed in the shell. The first air inlet 18 is used for connecting external equipment for introducing dusty gas. The first air outlet 19 is used for connecting vacuum equipment, and filtered gas is discharged through the first air outlet 19. A first clean air chamber and a first foul air chamber are arranged in the shell. A plurality of first filtering structures and vibrating structures are arranged in the first clean air chamber. The vibrating structures are used for vibrating the first filtering structures. The first foul air chamber is provided with a sweeping structure. The sweeping structure is used for sweeping ash filtered by the first filtering structures to the ash removal port 5. The ash collecting tank B includes a cylindrical shell and an ash bin 41. A second air inlet 35 and a second air outlet 32 are formed in the cylindrical shell. The ash removal port 5 is in communication with the second air inlet 35 through the ash conveying pipeline 31. A second clean air chamber and a second foul air chamber are arranged in the cylindrical shell. Second filtering structures are arranged in the second foul air chamber. The ash bin 41 is in communication with the second foul air chamber. An ash collecting structure is arranged in the ash bin 41. The ash collecting structure is used for collecting ash.

Specifically, in the present embodiment, one or more ash conveying pipelines 31 can be arranged. One end of one ash conveying pipeline 31 is respectively connected with one ash discharge device A, and the other end of each ash conveying pipeline 31 is connected to the same ash collecting tank B, thereby conveying materials in a closed manner between equipment. The ash conveying pipeline 31 is provided with a third pneumatic ball valve 30 for opening or closing the ash conveying pipeline 31.

In the present embodiment, the shell includes an upper shell 1 and a lower shell 4. The upper shell 1 is sealed with the lower shell 4 through a flange, and a closed chamber is formed inside. A first air outlet 19 and an upper temperature measuring port 14 are formed in the upper shell. The upper temperature measuring port 14 is located at the middle position of a side wall of the upper shell 1. The upper temperature measuring port 14 is used for placing a temperature measuring element for monitoring temperature inside the upper shell 1. The first air inlet 18, a lower temperature measuring port 13 and the ash removal port 5 are formed in the lower shell 4. The lower temperature measuring port 13 is close to the bottom of the lower shell 4. The lower temperature measuring port 13 is used for placing a temperature measuring element for monitoring temperature inside the lower shell 4. A first tube bundle board 29 is arranged between the upper shell 1 and the lower shell 4. The space enclosed by the upper shell 1 and the first tube bundle board 29 is the first clean air chamber. The space enclosed by the lower shell 4 and the first tube bundle board 29 is the first foul air chamber.

In the present embodiment, the first filtering structures are filter bags 27. A lower end of each filter bag 27 is in communication with a respective through hole in the first tube bundle board 29, and the filter bag 27 is connected with the first tube bundle board 29 through a hoop.

In the present embodiment, the ash discharge device A also includes a first air pocket 8. The first air pocket 8 is used for accommodating inert gas. The first air pocket 8 is located on the outer side of the upper shell 1 and on the same side as the first air outlet 19. A safety valve 16, a first solenoid valve 11 and a first manual ball valve 12 are arranged on the first air pocket 8. One end of the first blowing pipeline is located above the filter bags 27. The safety valve 16 installed above the first air pocket 8 is used for limiting the pressure of the first air pocket 8. The first air pocket 8 opens and closes an external air supply pipeline through the first solenoid valve 11 installed at the air inlet. The first manual ball valve 12 installed below the first air pocket 8 is used for maintaining air discharge and water drainage. The first air pocket 8 is in communication with the first clean air chamber through a first blowing pipeline. The first air pocket 8 provides a continuous and stable air source for blowing. An air outlet end of the first blowing pipeline is located above the first filtering structures. A pulse valve 9 and a first pneumatic ball valve 10 are arranged on the first blowing pipeline. The first air pocket 8 is in communication with the sweeping structure.

In the present embodiment, the sweeping structure includes a plurality of nozzles 17. The nozzles 17 are arranged opposite to the ash removal port 5. Optimally, four nozzles 17 are equally arranged in a 60-degree range opposite to the ash removal port 5 with the ash removal port 5 as a central point. The first air pocket 8 is in communication with one end of the connecting pipeline 15, and the other end of the connecting pipeline 15 is in communication with one end of each sweeping pipeline. The other end of each sweeping pipeline is in communication with one nozzle 17. The first air pocket 8 provides a continuous and stable gas source for sweeping. Each sweeping pipeline is provided with a second solenoid valve 7 and a second pneumatic ball valve 6.

In the present disclosure, the vibrating structures are arranged in the upper shell 1 and located above the filter bags. The upper shell 1 in the present embodiment is also provided with four supports 28. The lower end of each support 28 is connected with the first tube bundle board 29. The three supports 28 are evenly distributed along the outer ring of the first tube bundle board 29, and the other support 28 is located at the center of the first tube bundle board 29. Each vibrating structure includes a cylinder 21, a spring 23 and a movable hanger 25. A cylinder body of the cylinder 21 is connected with a cylinder stationary mount 22 on the upper shell 1. The cylinder stationary mount 22 is connected with the upper shell 1 through a flange. An end face of the cylinder body of the cylinder 21 is sealed with a flange bonding surface of the cylinder stationary mount 22, so that the upper shell 1 is isolated from outer atmosphere. An upper end of each support 28 is provided with a fixed hanger 20. The movable hanger 25 is located below the fixed hanger 20. A piston rod of the cylinder 21 is used for pushing the movable hanger 25, and the piston rod of the cylinder 21 is not connected with the movable hanger 25. One end of the spring 23 is connected with the fixed hanger 20, and the other end of the spring 23 is connected with the movable hanger 25. The movable hanger 25 is connected with upper ends of the filter bags 27 through screws 26. The tightness of the filter bag 27 is controlled by adjusting the screw 26. In the present disclosure, the cylinder 21 is matched with the spring 23, the movable hanger 25 is pushed or retracted to reciprocate, so that the vibration (simple harmonic vibration) of the filter bag 27 is realized, and attachments inside the filter bag 27 are removed.

In the present disclosure, the ash discharge device also includes a guide structure. The guide structure includes a guide sleeve and a guide rod. An upper end of the guide sleeve is connected with the fixed hanger 20. A lower end of the guide rod is connected with the movable hanger 25. The guide sleeve sleeves the outer side of the guide rod. An upper end of the guide rod extends into the guide sleeve from a lower end of the guide sleeve.

In the present disclosure embodiment, the number of the movable hangers 25 is three. Each movable hanger 25 corresponds to three guide mechanisms 24, six springs 23 and twelve filter bags 27.

In the present embodiment, the ash discharge device A also includes an air control box 2 and an electric control box 3. The air control box 2 and the electric control box 3 are located on the outer side of the upper shell 1. The electric control box 3 is located below the air control box 2. The air control box 2, the electric box 3 and the ash removal port 5 are located on the same side. The air control box 2 is connected with the interior of the upper shell 1 through a pipeline, and is used for controlling pneumatic components and collecting data. The electric control box 3 provides a power supply and control signals for the electrical components of the ash discharge device A.

In the present embodiment, the ash discharge device A has two working states, namely, a filtering state and an ash discharging state. In the filtering state, only the attachments on the inner surface of the filter bag 27 are vibrated to remove ash through the vibrating structures. In the ash discharging state, the filter bag 27 is firstly blown through the first blowing pipeline, then the filter bag 27 is vibrated to remove the ash through the vibrating structure, and finally the ash is swept and discharged.

In the present embodiment, the ash collecting tank B includes an upper cylindrical shell 45 and a lower cylindrical shell 42. The upper cylindrical shell 45 is connected with the lower cylindrical shell 42. The second air outlet 32 is located on a side wall of a closed head of the upper cylindrical shell 45 for conveying clean air to external negative-pressure pipeline equipment. The second air inlet 35 is located on a side wall of the lower cylindrical shell 42 and below the second filtering structure for connecting the ash conveying pipeline 31. A second tube bundle board 33 is arranged between the upper cylindrical shell 45 and the lower cylindrical shell 42. The space enclosed by the upper cylindrical shell 45 and the second tube bundle board 33 is the second clean air chamber. The space enclosed by the lower cylindrical shell 42 and the second tube bundle board 33 is the second foul air chamber. The second filtering structure is a sintered plate 34. An upper end of each sintered plate 34 is connected with a respective through hole in the second tube bundle board 33.

In the present embodiment, the second filtering structure is a sintered plate 34. The sintered plate 34 is installed on the second tube bundle board 33 for filtering dusty gas. There are five sintered plates 34.

In the present embodiment, the ash collecting tank B also includes a second air pocket 43. The second air pocket 43 is used for accommodating inert gas. The second air pocket 43 is located on a side wall of the cylindrical shell of the lower shell. The second air pocket 43 is in communication with the second clean air chamber through second blowing pipelines 44. The second blowing pipeline 44 is provided with the pulse valve. The second air pocket 43 provides a stable air source for the second blowing pipeline 44. An air outlet end of the second blowing pipeline 44 is located above the second filtering structure. Each sintered plate 34 corresponds to a nozzle on one second blowing pipeline 44. There are five second blowing pipelines 44 in total.

In the present embodiment, the ash bin 41 is located below the lower cylindrical shell 42 and is connected and fixed through flanges. The ash collecting structure in the ash bin 41 is driven by a driving structure. The driving structure includes a reducing motor 36, a magnetic coupling, a universal joint 52 and a reducer 53. The reducing motor 36 is installed on a flange seat 47 through screws. The flange seat 47 is installed on a stationary mount 50 through screws. The stationary mount 50 is installed on a side wall of and in communication with the ash bin 41. The magnetic coupling includes a magnetic outer rotor 48, a distance sleeve 49 and a magnetic inner rotor 46. The distance sleeve 49 separates the magnetic outer rotor 48 from the magnetic inner rotor 46. The distance sleeve 49 and the stationary mount 50 are sealed by flange end faces to isolate the ash bin 41 from outer atmosphere. The magnetic outer rotor 48 and the magnetic inner rotor 46 transmit torque through magnetic coupling force. The magnetic outer rotor 48 is rotatably connected with the flange seat 47 through a bearing, and is connected with an output end of the reducing motor 36 through a keyway. The distance sleeve 49 is installed in the flange seat cavity and is installed on the stationary mount 50 through flange screws. The magnetic inner rotor 46 is rotatably connected with the magnetic inner rotor stationary mount 51 through a bearing. The magnetic inner rotor stationary mount 51 is installed on the stationary mount 50 through flange screws. The magnetic inner rotor 46 is connected with the universal joint 52 through a keyway. The universal joint 52 is connected with the reducer 53 and the magnetic inner rotor 46 through a keyway for transmitting torque. The reducer 53 is installed on a stationary mount of the reducer 53 through a flange. A reducer stationary mount 54 is installed in the ash bin 41.

In the present embodiment, the ash collecting structure includes an auger structure, a material collecting board 40 and a scraper 37. A main shaft stationary mount 55 is located above an ash discharge port 56. An auger main shaft 39 of the auger structure is rotatably connected with the main shaft stationary mount 55 and the reducer stationary mount 54 through bearings. An upper end of the auger main shaft 39 is connected with the interior of the reducer 53 through a keyway. The auger structure is used for squeezing and conveying ash to the ash discharge port 56. The material collecting board 40 is used for collecting falling ash. The material collecting board 40 sleeves the outer side of an upper end of the auger main shaft 39 of the auger structure.

The outer side of the material collecting board 40 is connected with the ash bin 41, and the inner side of the material collecting board 40 is rotatably connected with the auger main shaft 39. The material collecting board 40 is installed below the reducer stationary mount 54 to separate the ash bin 41 up and down. An opening is formed the material collecting board 40 to be connected with the lower ash bin 41. The scraper 37 is located above the material collecting board 40. A lower end of the scraper 37 is in contact with the material collecting board 40. The scraper 37 is installed on the auger main shaft 39 through key connection for scraping materials on the material collecting board 40. The ash discharge port 56 is formed in a lower end of the ash bin 41. A rotary material valve 38 is arranged at the ash discharge port 56. The rotary material valve 38 is connected with the ash bin 41 through a flange for discharging ash in the ash bin 41.

The embodiment aims to improvement on device structure, and the control process is the prior art.

Specifically, during the filtration operation, the third pneumatic ball valve 30 in the ash conveying pipeline 31 is closed, so that the dusty gas is introduced into the first foul air chamber of the lower shell 4 from the first air inlet 18 and enters the filter bag 27 through the lower ends of the filter bags 27 fixed on the first tube bundle board 29. After filtration, the clean gas is discharged from the first air outlet 19 through negative pressure generated by the vacuum equipment. A part of the ash falls into the first foul air chamber of the lower shell 4 due to gravity, and a part of the ash is attached to the inner surfaces of the filter bags 27. After working for a period of time, the air permeability resistance of the filter bags 27 is increased due to the attachments on the inner surfaces of the filter bag s27, so the attachments on the inner surfaces of the filter bags 27 need to be removed by the vibrating structures. At this time, the piston rods of the cylinders 21 are extended to push the movable hangers 25, the springs 23 are tightened, the filter bags 27 are in a relaxed state, and the piston rods of the cylinders 21 are retracted. After the piston rods of the cylinders 21 are retracted, the movable hangers 25 are quickly pulled back. The lower ends of the filter bags 27 are fixed with the first tube bundle board 29. The upper ends of the filter bags 27 are respectively connected with the movable hangers 25 through the screws 26. The filter bags 27 are quickly tightened under the action of the springs 23. The ash on the inner surfaces of the filter bags 27 is quickly shaken off under the action of inertia and gravity. By the extension and retraction of the piston rods of the cylinders 21, the vibrating ash removal of the filter bags 27 is repeatedly realized. The three cylinders 21 are started and stopped to vibrate the movable hangers 25 in turn, and the vibrating ash removal operation is stopped after several seconds.

During the ash discharging operation, the filtering operation is stopped after running for one working cycle. A pipeline for introducing dusty gas and valves of the first air inlet 18 and the first air outlet 19 are closed. The first air pocket 8 instantaneously and discontinuously releases high-pressure and large-flow inert air flow into the upper shell 1 along the first blowing pipeline through the pulse valve 9 and the first pneumatic ball valve 10. The outer surfaces of the filter bags 27 are impacted by instantaneous pressure change, so that the filter bags 27 are deformed by pressure. The air flow blows back to the outer surfaces of the filter bags 27 to remove the ash on the inner surfaces of the filter bags 27, and the ash falls into the first foul air chamber of the lower shell 4. Then, the filter bags 27 are vibrated again to remove ash for several seconds. The ash discharging operation is started. When the third pneumatic ball valve 30 on the ash conveying pipeline 31 is opened, the first solenoid valve 11 is connected into the external air source to allow dusty gas into the first air pocket 8. The second solenoid valve 7 and the second pneumatic ball valve 6 on one sweeping pipeline are started, but the second solenoid valves 7 and the second pneumatic ball valves 6 on other sweeping pipelines do not work. High-speed and high-pressure gas flows through the nozzle 17 through the first air pocket 8 and the sweeping pipeline, and the air flow drives the accumulated ash to fly. The four sweeping pipelines are switched on and off several times in turn. The ash removal port 5 is connected with the ash conveying pipeline 31, the ash collecting tank B and the external negative-pressure pipeline, and there is a pressure difference between the ash removal port 5 and the first foul air chamber of the lower shell 4. The air flow carried with ash passes through the ash conveying pipeline 31 connected with the ash removal port 5, and then is filtered by the sintered plate 34 during ash collection. The ash falls into the ash bin 41 due to the action of gravity. The filtered air flow is discharged through the external negative pressure pipeline. Similarly, the remaining second solenoid valves 7 and second pneumatic ball valves 6 on the remaining sweeping pipelines are started and stopped in turn to realize blowing of the accumulated ash in the first foul gas chamber in the lower shell 4. The sweeping pipeline, the ash conveying pipeline 31, the ash collecting tank B and the external negative-pressure pipeline are cooperated together to complete ash discharging operation, thus realizing closed pipeline conveying of the ash.

When the ash in the ash bin 41 is accumulated to a certain amount, negative-pressure ash conveying operation is stopped. The third pneumatic ball valve 30 in the ash conveying pipeline 31 is closed, and the external negative-pressure pipeline valve is closed. The second blowing pipeline 44 is connected to the inert gas in the second air pocket 43. The sintered plates 34 are blown through the second blowing pipeline 44. With instantaneous high and low pressure switching, the air flow continuously acts on the inner walls of the sintered plates 34. The ash attached to the outer walls of the sintered plates 34 is blown away due to the instantaneous air flow reverse blowing, and falls into the ash bin 41 under gravity. After the blowing of the ash collecting tank B is completed, the rotary material valve 38 is started, and at the same time, the reducing motor 36 is started to start the ash discharging operation. The reducing motor 36 transmits the torque to the magnetic outer rotor 48. The magnetic outer rotor 48 transmits the torque to the magnetic inner rotor 46 through magnetic force. The torque is transmitted to the auger main shaft 39 by the magnetic inner rotor 46 and the universal joint 52 after being amplified by the reducer 53. The rotation of the auger main shaft 39 drives the scraper 37 to rotate. The scraper 37 scrapes off the materials on the material collecting board 40, and falls into the lower part of the ash bin 41 through a material port of the material collecting board 40. Under the action of the auger main shaft 39, the accumulated ash is squeezed downward and conveyed to the ash discharge port 56. The accumulated ash in the ash bin 41 is continuously discharged downward, and unoxidized accumulated ash is collected in the corresponding equipment in a closed manner.

In the present embodiment, the conveying efficiency is high. The ash can be conveyed in a closed environment. Automatic ash removal and centralized ash collection are realized, so that the manpower, time cost and equipment cost are reduced for enterprises, the working environment of workshops is improved, and the environmental pollution is reduced. The present embodiment solves the problem that the efficiency of manually cleaning the ash bin is low and secondary pollution is easily caused, the secondary pollution to the working environment is reduced, the working environment is greatly improved, and another step is taken forward for enterprises to build smart factories.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. An ash collecting system, comprising an ash discharge device, an ash conveying pipeline and an ash collecting tank, wherein the ash discharge device comprises a shell in which a first air outlet, a first air inlet and an ash removal port are formed, a first clean air chamber and a first foul air chamber are arranged in the shell, a plurality of first filtering structures and vibrating structures are arranged in the first clean air chamber, the vibrating structures are configured for vibrating the first filtering structures, the first foul air chamber is provided with a sweeping structure, and the sweeping structure is configured for sweeping ash filtered by the first filtering structures to the ash removal port; and wherein the ash collecting tank comprises a cylindrical shell and an ash bin, a second air inlet and a second air outlet are formed in the cylindrical shell, the ash removal port is in communication with the second air inlet through the ash conveying pipeline, a second clean air chamber and a second foul air chamber are arranged in the cylindrical shell, second filtering structures are arranged in the second foul air chamber, the ash bin is in communication with the second foul air chamber, an ash collecting structure is arranged in the ash bin, and the ash collecting structure is configured for collecting ash.

2. The ash collecting system according to claim 1, wherein the ash discharge device also comprises a first air pocket located outside the shell, a safety valve, a first solenoid valve and a first manual ball valve are arranged on the first air pocket, the first air pocket is in communication with the first clean air chamber through a first blowing pipeline, an air outlet end of the first blowing pipeline is located above the first filtering structures, a pulse valve and a first pneumatic ball valve are arranged on the first blowing pipeline, and the first air pocket is in communication with the sweeping structure.

3. The ash collecting system according to claim 1, wherein the ash collecting tank also comprises a second air pocket, the second air pocket is located outside the cylindrical shell, the second air pocket is in communication with the second clean air chamber through a second blowing pipeline, and an air outlet end of the second blowing pipeline is located above the second filtering structures.

4. The ash collecting system according to claim 1, wherein the shell comprises an upper shell and a lower shell, the upper shell is connected with the lower shell, the first air outlet and an upper temperature measuring port are formed in the upper shell, the first air inlet, a lower temperature measuring port and the ash removal port are formed in the lower shell, a first tube bundle board is arranged between the upper shell and the lower shell, a space enclosed by the upper shell and the first tube bundle board is the first clean air chamber, and a space enclosed by the lower shell and the first tube bundle board is the first foul air chamber.

5. The ash collecting system according to claim 1, wherein the ash collecting tank comprises an upper cylindrical shell and a lower cylindrical shell, the upper cylindrical shell is connected with the lower cylindrical shell, a second tube bundle board is arranged between the upper cylindrical shell and the lower cylindrical shell, a space enclosed by the upper cylindrical shell and the second tube bundle board is the second clean air chamber, and a space enclosed by the lower cylindrical shell and the second tube bundle board is the second foul air chamber; and the second filtering structures are sintered plates, and upper ends of the sintered plates are in communication with respective through holes in the second tube bundle board.

6. The ash collecting system according to claim 2, wherein the sweeping structure comprises a plurality of nozzles, the nozzles are arranged opposite to the ash removal port, the first air pocket is in communication with the nozzles through respective sweeping pipeline, and each sweeping pipeline is provided with a second solenoid valve and a second pneumatic ball valve.

7. The ash collecting system according to claim 4, wherein the first filtering structures are filter bags, and lower ends of the filter bags are in communication with respective through holes in the first tube bundle board; the vibrating structures are located above the first filtering structures, each vibrating structure comprises a cylinder, a spring and a movable hanger, a cylinder body of the cylinder is connected with the upper shell, a piston rod of the cylinder is configured for pushing the movable hanger, one end of the spring is connected with a fixed hanger in the upper shell, an other end of the spring is connected with the movable hanger, and the movable hanger is connected with upper ends of the first filtering structures.

8. The ash collecting system according to claim 7, wherein the ash discharge device also comprises a support and a guide structure, the support and the guide structure are arranged in the first clean air chamber, a lower end of the support is connected with the first tube bundle board, an upper end of the support is provided with the fixed hanger, the guide structure comprises a guide sleeve and a guide rod, the guide sleeve sleeves an outer side of the guide rod, the guide sleeve is connected with the fixed hanger, and the guide rod is connected with the movable hanger.

9. The ash collecting system according to claim 1, wherein the ash collecting structure comprises an auger structure, a material collecting board and a scraper, the material collecting board sleeves an outer side of an upper end of an auger main shaft of the auger structure, an outer side of the material collecting board is connected with the ash bin, an inner side of the material collecting board is rotatably connected with the auger main shaft, the scraper is located above the material collecting board, a lower end of the scraper is in contact with the material collecting board, the scraper sleeves the outer side of the upper end of the auger main shaft, the scraper is connected with the auger main shaft, the auger main shaft is rotatably connected with the ash bin, an ash discharge port is formed in a lower end of the ash bin, and a rotary material valve is arranged at the ash discharge port.

10. The ash collecting system according to claim 9, wherein the ash collecting structure is driven by a driving structure, the driving structure comprises a reducing motor, a magnetic outer rotor, a magnetic inner rotor, a universal joint and a reducer, an output end of the reducing motor is connected with the magnetic outer rotor, the magnetic inner rotor is located on an inner side of the magnetic outer rotor, the magnetic inner rotor is connected with an input end of the reducer through the universal joint, and the auger main shaft is connected with an output end of the reducer.

* * * * *